(12) United States Patent
Johansson et al.

(10) Patent No.: US 6,460,685 B1
(45) Date of Patent: Oct. 8, 2002

(54) CONVEYOR FOR GARMENT HANGERS

(75) Inventors: Magnus Johansson, Sjömarken; Carl-Magnus Jacobsson, Borås, both of (SE)

(73) Assignee: Jensen Sweden AB (SE)

( * ) Notice: Subject to any disclaimer, the term of this patent is extended or adjusted under 35 U.S.C. 154(b) by 0 days.

(21) Appl. No.: 09/914,032

(22) PCT Filed: Mar. 2, 2000

(86) PCT No.: PCT/SE00/00419

§ 371 (c)(1),
(2), (4) Date: Feb. 12, 2000

(87) PCT Pub. No.: WO00/51918

PCT Pub. Date: Sep. 8, 2000

(30) Foreign Application Priority Data

Mar. 3, 1999 (SE) .............................................. 9900754

(51) Int. Cl.⁷ .............................................. B65G 43/08
(52) U.S. Cl. ................. 198/465.4; 198/678.1; 198/813
(58) Field of Search ................. 198/465.4, 678.1, 198/683, 684, 810.04, 813

(56) References Cited

U.S. PATENT DOCUMENTS 5,082,107 A * 1/1992 Grube et al. ......... 198/465.4 X
5,337,883 A * 8/1994 Kuhlmann ............... 198/465.4
5,456,346 A * 10/1995 Schilling et al. ..... 198/678.1 X

FOREIGN PATENT DOCUMENTS

| DE | 4324127 | * 2/1994 | .............. 198/465.4 |
| DE | 43 19 164 | 3/1996 | |
| EP | 0 560 106 | 9/1993 | |

* cited by examiner

*Primary Examiner*—James R. Bidwell
(74) *Attorney, Agent, or Firm*—Lerner, David, Littenberg, Krumholz & Mentlik, LLP

(57) ABSTRACT

Conveyors for clothes hangers are provided comprising an endless chain constructed from a plurality of chain links and runs between a first return axis at one end of the conveyor and a second return axis at the other end of the conveyor, so that the chain, guided around the return axes, is divided into upper and lower portions, the hanging hooks of the clothes hangers resting in depressions in the chain links constituting the upper chain portion, and a drive motor driving the chain in the desired direction. The chain portion is arranged to be deflected laterally by deflecting members so that a deflected part of the lower chain portion runs parallel and laterally displaced in relation to its upper portion, and the drive wheel is in driving engagement with the deflected part of the lower chain portion.

11 Claims, 3 Drawing Sheets

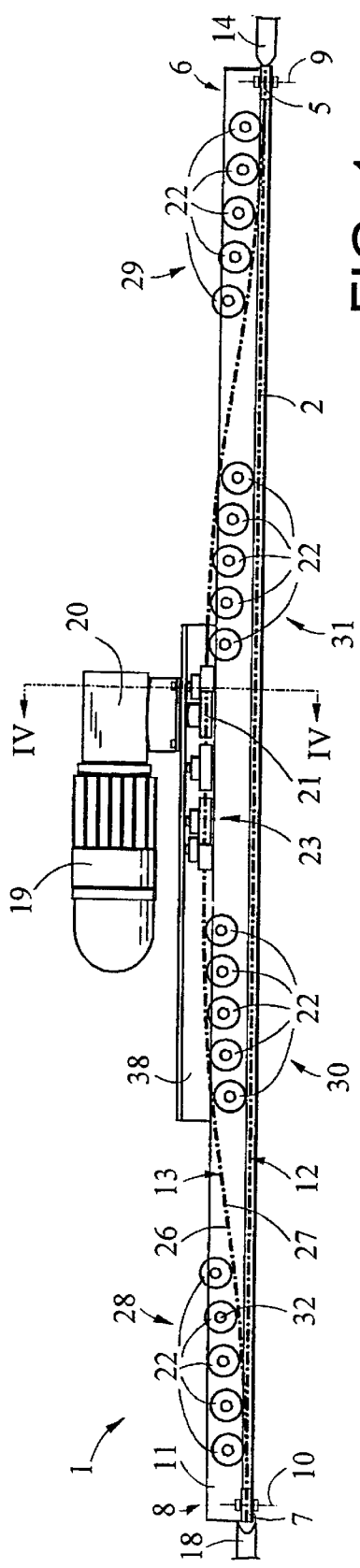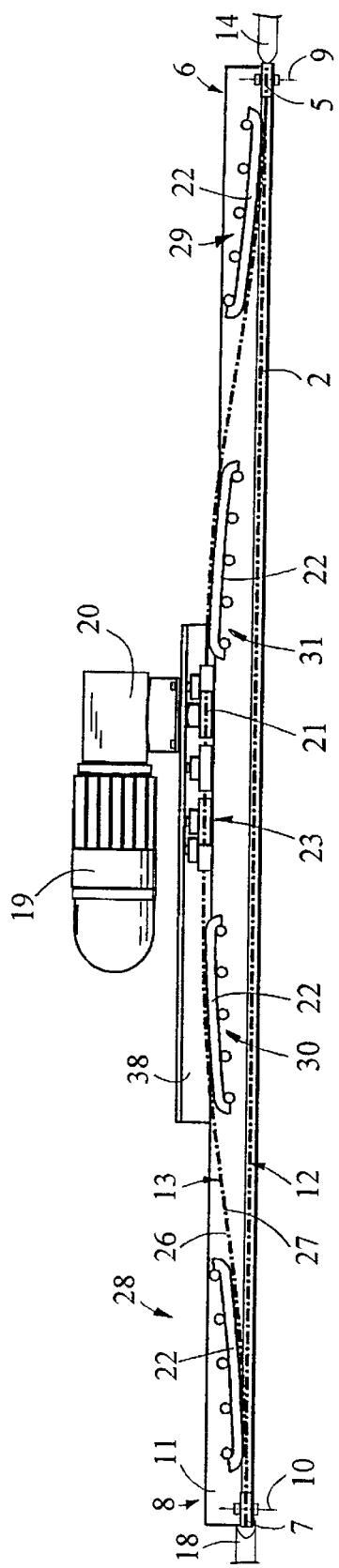

CONVEYOR FOR GARMENT HANGERS

FIELD OF THE INVENTION

The present invention relates to a conveyor for clothes hangers provided with hanging hooks of the type described in the precharacterizing clause of Patent claim 1 below. Accordingly, the conveyor comprises a chain, the hanging hooks of the clothes hangers resting directly in depressions in the links of the chain.

BACKGROUND OF THE INVENTION

Conveyors for clothes hangers, that is to say hangers intended for storing and transporting articles of clothing, exist in a number of known versions, usually comprising wires or chains as the main elements in the conveying track. In this connection, the chain conveyor represents one of the most common types of conveyor and comprises in a conventional manner an endless chain constructed from a plurality of chain links, which runs between a first chain wheel located at one end of the conveyor and a second chain wheel located at the other end of the conveyor.

The chains of the conveyor are often provided with pushers for the hanging hooks of the clothes hangers, for example in the form of projections from the chain links. However, such pushers are required chiefly in conveyors with an essentially vertical conveying direction, while conveyors with an essentially horizontal conveying direction can instead make use of depressions in conventional chain links as pushers.

A number of chain conveyors may also form part of a larger conveying system for clothes hangers, in which inclined slide rails interconnect said chain conveyors in specially adapted configurations for, for example, the ready-made clothing industry or laundries. In this connection, an individual chain conveyor may, for example, be provided with clothes hangers from a feed-in slide rail which is inclined down towards the chain and from which the hanging hooks of the hangers drop down onto the chain and are conveyed along the chain conveyor to its feed-out end, where they are transferred to a downwardly inclined feed-out slide rail.

In a conventional chain conveyor for clothes hangers, the chain is driven by a drive motor being coupled by means of a drive shaft to a chain wheel at one end of the conveyor. In this connection, a problem exists when the hanging hooks of the hangers pass the drive end of the conveyor, for example its feed-out end, in so far as the free ends of the hooks strike the drive shaft and are then forced to climb over the drive shaft. In unfavorable cases, and especially at high feed-in speeds, this climbing can result in the hangers being misaligned with costly operational stoppages as a consequence.

In order to avoid the free end of the hook striking the drive shaft, the free end can be made shorter, so that contact with the drive shaft is avoided, but such a design of the hook means that its ability to retain the hanger safely even when subject to lateral loading along the curves of the conveyor system is drastically reduced—with reduced operational safety as a consequence.

However, German patent specification DE 43 19 164 A1 describes a solution to the problem mentioned above. The undesirable contact between the free ends of the hanging hooks and the drive shaft is avoided in this case by the driving chain wheel, together with the drive shaft and the drive motor, being arranged at an angle. This angled arrangement nevertheless leads to other disadvantages, such as the drive unit being more bulky at the same time as its assembly becomes relatively complicated and thus more expensive than a conventional horizontal assembly.

SUMMARY OF THE INVENTION

The solution to the problems mentioned above is achieved in a conveyor having the characteristics indicated in the appended Patent claim 1. Advantageous embodiments of the invention are indicated in the dependent claims.

Accordingly, a conveyor for clothes hangers provided with hanging hooks is disclosed, which comprises an endless chain which is constructed from a plurality of chain links and runs between a first return axis located at one end of the conveyor and a second return axis located at the other end of the conveyor, so that the chain, by being guided around said return axes, is divided into an upper and a lower portion, the hanging hooks of the clothes hangers resting directly, during conveying, in depressions in the chain links which constitute the upper portion of the chain, and a drive motor arranged so as, by means of a drive wheel, to drive the chain in the desired direction. The invention is characterized in that the lower portion of the chain is arranged so as, between said first and second return axes, to be deflected laterally by means of deflecting members so that a deflected part of the lower portion of the chain is made to run parallel in a laterally displaced manner in relation to its upper portion, and in that said drive wheel is in driving engagement with the deflected part of the lower portion of the chain.

In a preferred embodiment, said deflecting members bear against lateral surfaces on the chain links during deflection.

Furthermore, at least one first deflecting member bears against one lateral surface of the chain links, while at least one second deflecting member bears against the other lateral surface of the chain links.

In a favorable embodiment, the deflecting members are divided into four groups, two of which bear against one lateral surface of the chain links, while two bear against the other lateral surface of the chain links.

In a preferred embodiment, said deflecting members consist of one or more rollers.

In an alternative embodiment of the invention, said deflecting members consist of one or more guide rails.

In an advantageous embodiment, a chain-tensioning arrangement is also located in the region of the deflected part of the lower portion of the chain.

Advantageously, the chain-tensioning arrangement comprises a primary tensioning wheel for rough tensioning of the chain during assembly of the conveyor, and a secondary tensioning wheel for fine tensioning of the chain.

Finally, in an expedient embodiment of the invention, an inductive sensor is located in close proximity to a chain wheel in the region of the deflected part of the lower portion of the chain, said sensor being adapted so as to indicate the feed speed of the conveyor by inductive sensing of the passing teeth of the chain wheel.

Further characteristics and advantages of the invention are indicated in the detailed description below of a preferred embodiment.

BRIEF DESCRIPTION OF THE DRAWINGS

Two embodiments of the invention are described below with reference to the appended drawings, in which:

FIG. 1 is a diagrammatic top view of a conveyor according to a preferred embodiment of the invention, in which the deflecting members are in the form of rollers;

FIG. 2 is a diagrammatic top view of a conveyor according to an alternative embodiment of the invention, in which the deflecting members are in the form of guide rails;

DETAILED DESCRIPTION

Figure 3:
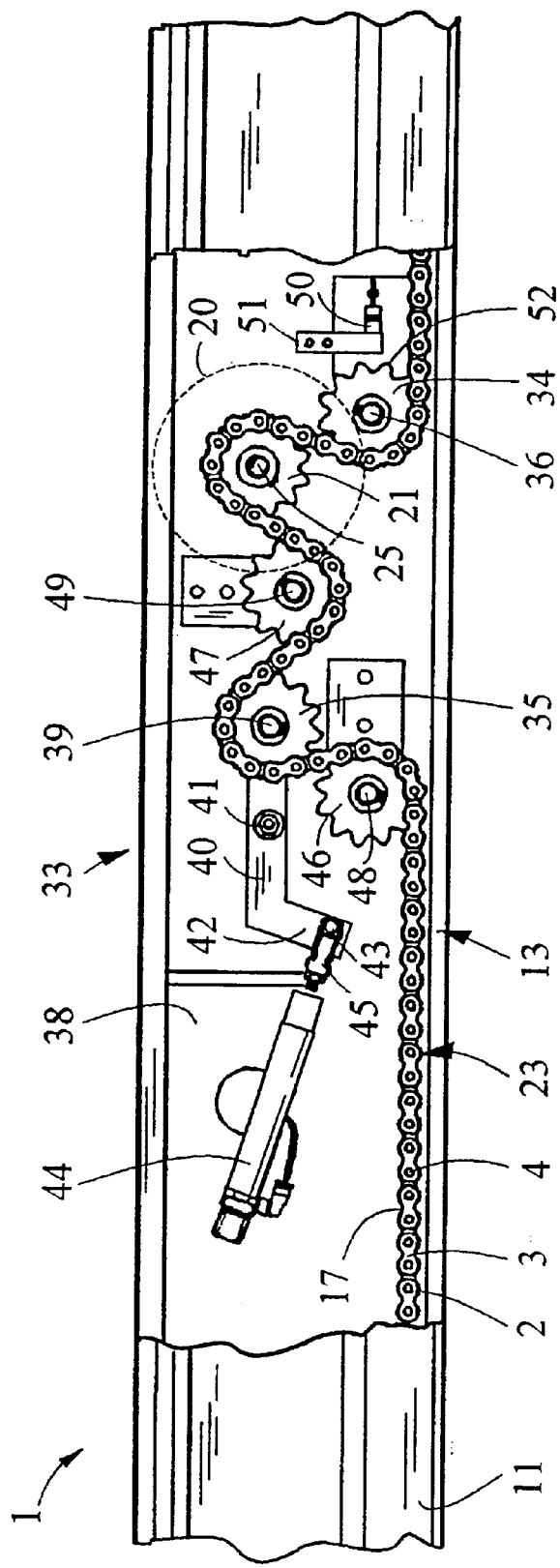
FIG. 3 is a cut-away side view of the drive and chain-tensioning arrangement of the conveyor.

In FIG. 1, reference number 1 designates generally a conveyor for clothes hangers. The figure is diagrammatic and shows a preferred embodiment of the conveyor from above. The conveyor 1 comprises an endless chain 2 which is shown in simplified form in FIG. 1 by a dot-dash line. As can be seen from FIGS. 3 and 4, the chain is of the conventional type and is accordingly constructed from a plurality of chain links 3 which are linked together rotatably by means of chain pins 4. The chain 2 is also adapted in such a manner that, by means of adjustment of the play between individual chain links, it is flexible in the lateral direction but only to a limited extent.

As can be seen from FIG. 1, the chain 2 runs between a first chain wheel 5 located at one end 6 of the conveyor and a second chain wheel 7 located at the other end 8 of the conveyor. The two chain wheels 5, 7 are each mounted about their own return axis 9, 10 in an elongate frame rail 11 which is preferably made from a single or composite aluminum profile. In an alternative embodiment (not shown) of the invention, the chain wheels 5, 7 are replaced by fixed sliding surfaces around the return axes 9, 10, the chain 2 instead sliding over the sliding surfaces. The sliding surfaces can, for example, be arranged on a cylindrical sliding body made of plastic with a low coefficient of friction.

By virtue of being guided around the two chain wheels 5, 7, the chain 2 is divided into an upper portion 12 which functions as the conveying track, and a lower portion 13 which serves as the return track.

The right end 6 in FIG. 1 of the conveyor is located in close proximity to a feed-in slide rail 14 which is inclined down towards the upper portion 12 of the chain 2 and along which clothes hangers 15 (not shown in FIG. 1 but shown in FIG. 4) slide down onto the chain 2 when the conveyor 1 is in operation. As can be seen from FIG. 4, which is a section along the line IV—IV in FIG. 1, the hanging hooks 16 of the clothes hangers 15 rest directly, during conveying, in depressions 17 in the chain links 3 which constitute the upper portion 13 of the chain 2. The hanging hooks 17 have conventional drawn-down free ends 24. At the other end 8 of the conveyor 1, the clothes hangers 15 are guided from the chain 2 onto a downwardly inclined feed-out slide rail 18 for onward conveying. The conveyor 1 is driven by an electric drive motor 19 which, by means of a gear 20, is arranged so as, by means of a drive shaft 25 and a drive wheel 21 fixed thereon, to drive the chain 2 in the desired direction. In this connection, the lower portion 13 of the chain 2 is arranged so as to be deflected in the lateral direction between said first and second chain wheels 5, 7 by means of deflecting members 22. In the preferred embodiment, the deflecting members 22 consist of a plurality of rollers coated with a hard-wearing plastic material such as, for example, polyurethane plastic. In this way, a deflected part 23 of the lower portion 13 of the chain 2 is made to run parallel in a laterally displaced manner in relation to its upper portion 12.

The drive wheel 21 is in driving engagement with the deflected part 23 of the lower portion 13 of the chain 2. By virtue of the fact that the conveyor 1 is thus not driven in a conventional manner, that is to say directly on one of the two chain wheels 5, 7, the problem of the free ends 24 of the hanging hooks 16 of the clothes hangers 15 striking the drive shaft 25 is avoided. As a result, increased operational safety is therefore achieved.

As can be seen from FIG. 1, the deflecting members 22, that is to say the rollers in the preferred exemplary embodiment, bear against lateral surfaces 26, 27 on the chain links 3 during deflection. In this embodiment, the bearing therefore takes place in the form of a rolling engagement, which produces minimal friction between the rollers 22 and the lateral surfaces 26, 27 of the chain links 3. As a result, the life of the chain 2 is also extended. In order to make the deflected part 23 of the lower portion 13 of the chain 2 run in a laterally displaced manner parallel to the upper portion 12, the rollers 22 are essentially evenly distributed in four groups 28, 29, 30, 31, two groups 28, 29 of which bear against one lateral surface 26 of the chain links 3, while two groups 30, 31 bear against the other lateral surface 27 of the chain links 3. In the preferred exemplary embodiment, each such group 28, 29, 30, 31 comprises five rollers 22. The rollers 22 are mounted rotatably about spindles 32 which are in turn fixed in the frame rail 11 of the conveyor 1. For the purpose of deflecting the chain 2 gently, the spindles 32 of the rollers 22 are successively laterally displaced in relation to one another within a group. In an alternative embodiment (not shown), however, a group 28, 29, 30, 31 can consist of a single roller 22, although such a solution subjects the chain 2 to greater loading and is not possible in some cases as the minimum lateral deflection radius of the chain 2 may not be achieved.

FIG. 2 shows an alternative embodiment of the invention, in which the deflecting members 22 instead consist of four guide rails. The guide rails 22 are coated with a material which affords low friction against the lateral surfaces 26, 27 of the chain links 3, such as, for example, polyurethane plastic. In a similar manner to that in which the rollers 22 are successively laterally displaced in relation to one another in FIG. 1, the rails are correspondingly curved in order to deflect the chain 2 gently.

FIG. 3 is a cut-away side view of the conveyor 1 in the region around the drive wheel 21. It can be seen from the figure that a chain-tensioning arrangement 33 is located in the region of the deflected part 23 of the lower portion 13 of the chain 2 and in direct proximity to the drive wheel 21. The chain-tensioning arrangement 33 comprises a primary tensioning wheel 34 for rough tensioning of the chain 2 during assembly of the conveyor 1, and a secondary tensioning wheel 35 for fine tensioning of the chain 2. The chain-tensioning arrangement 33 is accommodated, together with the drive wheel 21 of the conveyor 1, in a drive unit housing 38, to which the motor 19 is also fastened by means of its gear 20.

Figure 4:
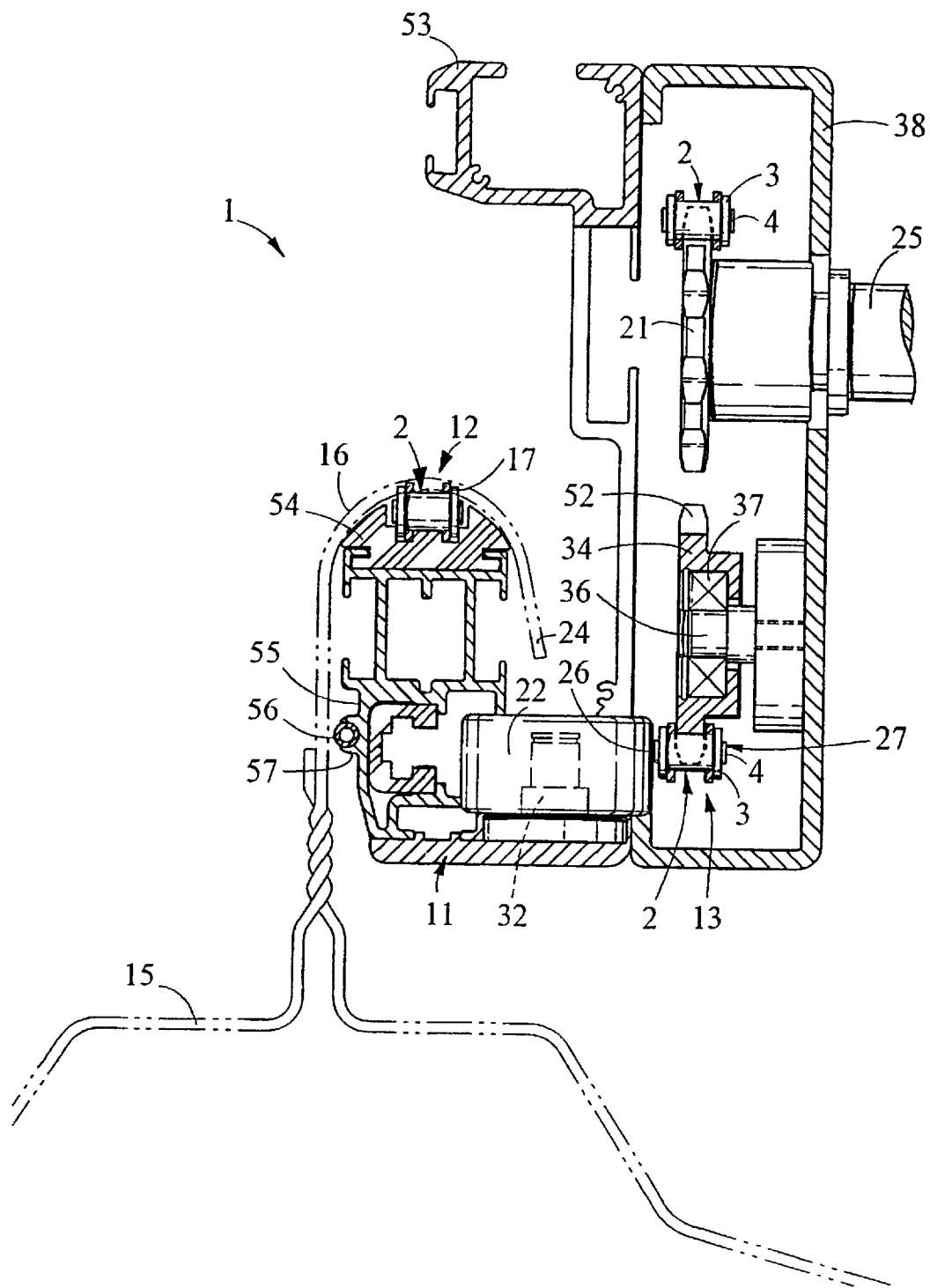
FIG. 4 is a sectional view along the line IV—IV in FIG. 1.

As can be seen most clearly from FIG. 4, the primary tensioning wheel 34 is mounted about a spindle 36 by means of a bearing 37. In this connection, the tensioning wheel 34 is located in close proximity to the drive wheel 21. Rough tensioning of the chain 2 takes place during assembly of the conveyor 1. The primary tensioning wheel 34 is then mounted in a fixed position in such a manner that the slack of the chain 2 is taken up only partly.

It can be seen from FIG. 3 that the secondary tensioning wheel 35 is supported by means of a spindle 39 by a rocker arm 40 which is fastened to the drive unit housing 38 pivotably about a spindle 41 located essentially in the center of the rocker arm 40. The opposite end 42 of the rocker arm 40 is adapted so as, by means of a mounting 43, to be acted on by a pneumatic actuator 44. When the rocker arm 40 is acted on by the piston rod 45 of the actuator, the chain 2 is tensioned as the secondary tensioning wheel 35 is displaced by means of lever action around the spindle 41. By virtue of the fact that the actuator 44 is pneumatically controlled, the degree of chain tensioning can be easily controlled from outside—even during operation of the conveyor 1—in order to achieve optimum chain tension. Idlers 46 and 47 respectively are positioned on either side of the secondary tensioning wheel 35. The idlers 46, 47 are mounted on spindles 48, 49 which are fastened to the drive unit housing 38 in a fixed manner.

It can also be seen in FIG. 3 that an inductive sensor 50 is located in close proximity to the primary tensioning wheel 36 so as to indicate the feed speed of the conveyor 1 by inductive sensing of the passing teeth 52 of the tensioning wheel 34. The sensor 50 is fastened to the drive unit housing 38 in a fixed manner by means of a bracket 51.

Finally, it can be seen from FIG. 4 that the frame rail 11 has inter alia an upper projection 53 which is adapted for suspending the conveyor 1 when the same is ceiling-mounted. The frame rail 11 also has a bearing portion 54 for the upper portion 12 of the chain 2. The bearing portion 54 is made of a plastic material, for example polyurethane, which affords low friction between the frame rail 11 and the chain 2. Arranged along the entire length of the outside 55 of the frame rail 11 is a guide strip 56 in order to reduce the friction between the frame rail 11 and the passing clothes hangers 15, the hanging hooks 16 of which would otherwise scrape directly against the frame rail 11. The guide strip 56 is in the form of a circular cylindrical tube which is arranged, with a press fit, in a longitudinal groove 57 in the frame rail 11. In this connection, the inside of the groove 57 follows closely the external shape of the guide strip.

The invention is not limited to the embodiments described above and shown in the drawings but can be varied freely within the scope of the patent claims below. For example, the deflecting members 22 can alternatively consist of a number of spindle pins (not shown) which are fastened to the frame rail 11 in a fixed manner. The spindle pins can suitably be coated with a plastic material which affords low friction against the lateral surfaces 26, 27 of the chain links 3. Furthermore, the inductive sensor 50 described above can be positioned in proximity to any one of the other chain wheels 21, 35, 46 or 47. The number of deflecting members 22 can also be varied according to requirements, depending on the minimum permitted lateral deflection radius for the chain 2 being used.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Conveyor for clothes hangers provided with hanging hooks, which conveyor comprises:
    an endless chain which is constructed from a plurality of chain links and runs between a first return axis located at one end of the conveyor and a second return axis located at the other end of the conveyor, so that the chain, by being guided around said return axes, is divided into an upper and a lower portion,
    said chain links being provided with depressions, whereby the hanging hooks of the clothes hangers are arranged for resting directly, during conveying, in said depressions on said upper portion of the chain, and
    a drive motor arranged so as, by means of a drive wheel, to drive the chain in the desired direction,
    wherein the lower portion of the chain is arranged so as, between said first and second return axes, to be deflected laterally by means of deflecting members so that a deflected part of the lower portion of the chain is made to run parallel in a laterally displaced manner in relation to its upper portion, and in that said drive wheel is in driving engagement with the deflected part of the lower portion of the chain.

2. Conveyor according to claim 1, wherein said deflecting members bear against lateral surfaces on the chain links during deflection.

3. Conveyor according to claim 2, wherein said deflecting members includes at least one first deflecting member bears against one lateral surface of the chain links, and at least one second deflecting member which bears against the other lateral surface of the chain links.

4. Conveyor according to claim 3, wherein said deflecting members consist of one or more rollers.

5. Conveyor according to claim 3, wherein said deflecting members consist of one or more guide rails.

6. Conveyor according to claim 3, wherein said deflecting members are divided into four groups, said first deflecting member including two groups and said second deflecting member including two groups.

7. Conveyor according to claim 6, wherein a chain-tensioning arrangement is located in the region of the deflected part of the lower portion of the chain.

8. Conveyor according to claim 7, wherein said chain-tensioning arrangement comprises a primary tensioning wheel for rough tensioning of the chain during assembly of the conveyor, and a secondary tensioning wheel for fine tensioning of the chain.

9. Conveyor according to claim 1, wherein an inductive sensor is located in close proximity to a chain wheel in the region of the deflected part of the lower portion of the chain, said sensor being adapted so as to indicate the feed speed of the conveyor by inductive sensing of the passing teeth of the chain wheel.

10. Conveyor for clothes hangers provided with hanging hooks, which conveyor comprises:
    an endless chain which is constructed from a plurality of chain links and runs between a first return axis located at one end of the conveyor and a second return axis located at the other end of the conveyor, so that the chain, by being guided around said return axes, is divided into an upper and a lower portion,
    said chain links being provided with depressions, whereby the hanging hooks of the clothes hangers are arranged for resting directly, during conveying, in said depressions on the upper portion of the chain,
    a drive motor arranged so as, by means of a drive wheel, to drive the chain in the desired direction,
    wherein the lower portion of the chain is arranged so as, between said first and second return axes, to be deflected laterally by means of deflecting members so that a deflected part of the lower portion of the chain is made to run parallel in a laterally displaced manner in relation to its upper portion, and in that said drive wheel is in driving engagement with the deflected part of the lower portion of the chain, and a chain-tensioning arrangement is located in the region of the deflected part of the lower portion of the chain.

11. Conveyor according to claim 10, wherein said chain-tensioning arrangement comprises a primary tensioning wheel for rough tensioning of the chain during assembly of the conveyor, and a secondary tensioning wheel for fine tensioning of the chain.

* * * * *

UNITED STATES PATENT AND TRADEMARK OFFICE
CERTIFICATE OF CORRECTION

PATENT NO. : 6,460,685 B1
DATED : October 8, 2002
INVENTOR(S) : Magnus Johansson and Carl-Magnus Jacobsson It is certified that error appears in the above-identified patent and that said Letters Patent is hereby corrected as shown below:

<u>Title page,</u>
Item [86], "Feb. 12, 2000" should read -- Feb. 12, 2002 --.

Signed and Sealed this

Twentieth Day of May, 2003

JAMES E. ROGAN
*Director of the United States Patent and Trademark Office*